Figure 1:
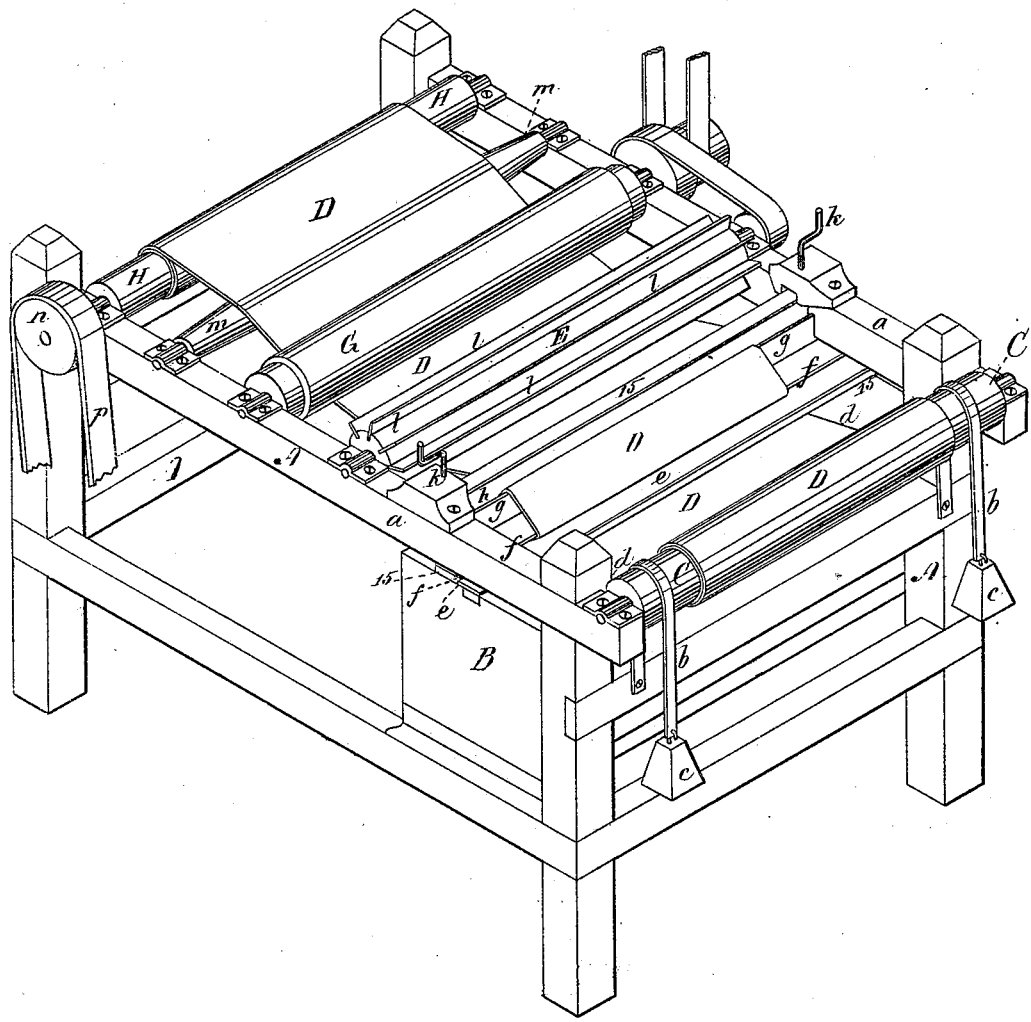

(No Model.) 2 Sheets—Sheet 1.

N. S. YORK & A. W. LANE.
MANUFACTURE OF OILED WATERPROOF FABRIC.

No. 270,717. Patented Jan. 16, 1883.

WITNESSES
W. J. Cambridge
Chas. E. Griffin

INVENTORS
Nathaniel S. York
Albert W. Lane
per F. E. Teschemacher
Atty (No Model.) 2 Sheets—Sheet 2.
N. S. YORK & A. W. LANE.
MANUFACTURE OF OILED WATERPROOF FABRIC.
No. 270,717. Patented Jan. 16, 1883.
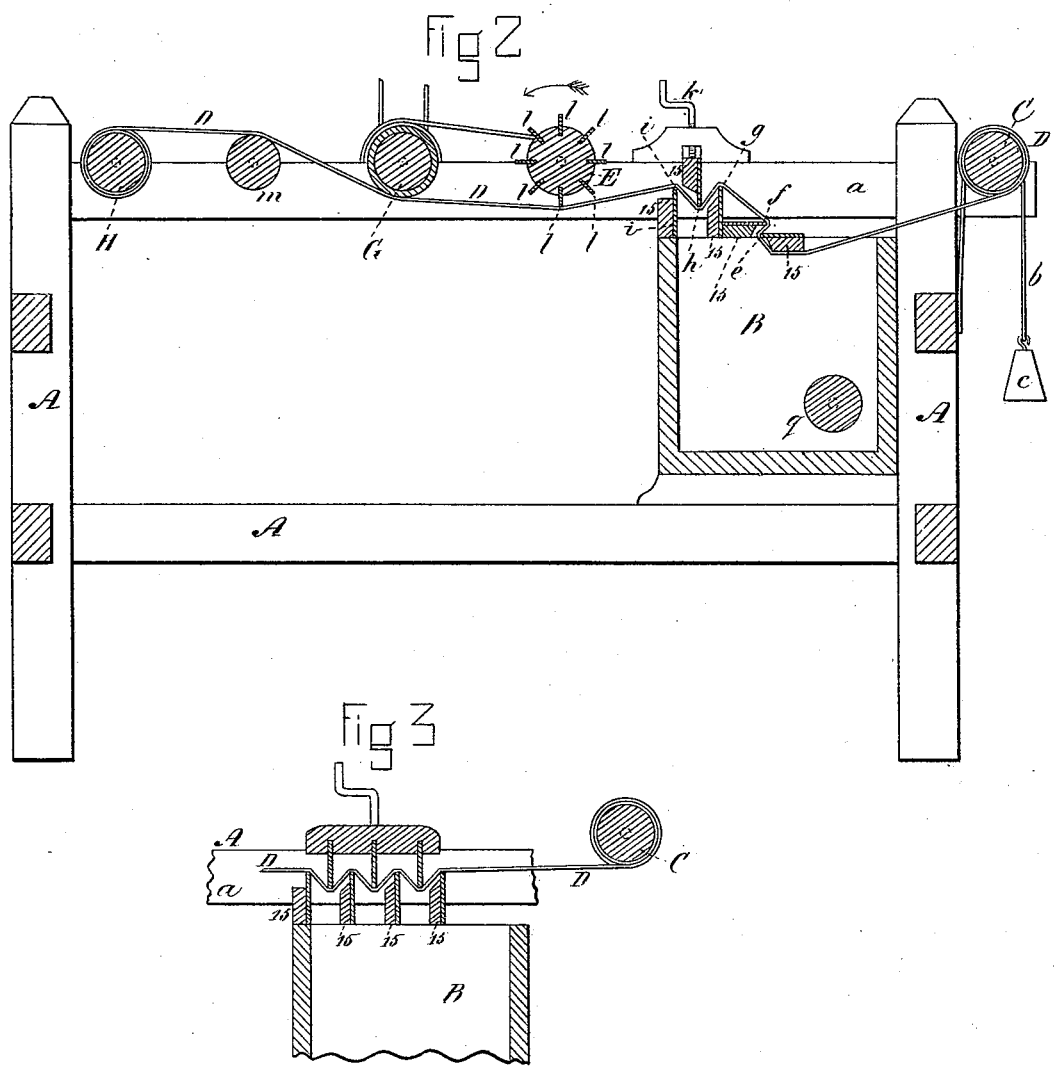
WITNESSES
W. J. Cambridge
Chas. E. Griffin
INVENTORS
Nathaniel S. York
Albert W. Lane
per P. E. Teschemacher
Atty

UNITED STATES PATENT OFFICE.

NATHANIEL S. YORK AND ALBERT W. LANE, OF ROCKPORT, MASS.

MANUFACTURE OF OILED WATER-PROOF FABRICS.

SPECIFICATION forming part of Letters Patent No. 270,717, dated January 16, 1883.

Application filed January 23, 1882. (No model.)

*To all whom it may concern:*

Be it known that we, NATHANIEL S. YORK and ALBERT W. LANE, citizens of the United States, residing at Rockport, in the county of Essex and State of Massachusetts, have invented certain new and useful Improvements in the Manufacture of Oiled Water-Proof Fabrics, of which the following is a full, clear, and exact description, reference being had to the accompanying drawings, making part of this specification, in which—

Figure 1 is a perspective view of our improved machine for producing oiled waterproof fabrics. Fig. 2 is a longitudinal vertical section through the center of the same. Fig. 3 represents a modification.

The oiled cloth commonly used for stout water-proof clothing has heretofore been made by dipping the fabric into boiled linseed-oil or the usual waterproofing oil compound composed of boiled linseed-oil mixed with suitable coloring-matter and other substance to give it the required body, and then, after it became thoroughly saturated with the oil compound, passing it between rubber pressure-rolls, which expressed all the surplus oil, after which one or more additional coats of oil or oil compound were applied to the surface of the fabric by means of a brush. This method is, however, objectionable, for the reason that the wringing to which the cloth is subjected by passing it between the rolls presses the oil almost entirely out of its pores, and consequently it is not rendered as perfectly waterproof as is desirable, owing to the absence of the oil from the central or inner portion of the fabric, while the coat or coats of oil applied to its surface by the brush gave it a rough and unfinished appearance.

Our invention has for its object to overcome these objections; and it consists in drawing the cloth or fabric, after the application thereto of the waterproofing liquid substance, over or in contact with a series of sharp-edged scraping-blades in lieu of wringing it between pressure-rolls, as heretofore, whereby the surplus oil is uniformly removed from its surface in such manner as to leave all of the pores of the fabric uniformly filled with the oil or waterproofing substance, and afterward subjecting the fabric to the action of one or more rapidly-revolving dressing-cylinders provided with blades, which remove any impurities or surplus oil from its surface which may have been left thereon by the stationary scraping-edges in contact with which it has passed, and impart a fine, smooth finish to the goods.

In the said drawings, A represents the framework of the machine which we employ for producing our improved oiled water-proof fabric.

At one end of the machine, and extending transversely across it, is secured a tank or receptable, B, for containing the usual liquid waterproofing substance or compound, such as boiled linseed-oil, either alone or mixed with coloring-matter, and a suitable substance to give it the required body.

In suitable bearings in the upper horizontal bars, $a$, of the frame-work A, and in close proximity with the tank B, are supported the journals of a long removable roll, C, upon which is wound the cloth or fabric D to be treated for the purpose of rendering it water-proof, the roll being provided with a suitable friction device—in the present instance a pair of straps, $b$, passing over the ends of the roll and provided with weights $c$—for preventing the cloth from unwinding any faster than it is required for use, thus avoiding any slackness, as might otherwise occur. The cloth D passes from the roll C over the tank B, which is of greater length than the width of the cloth, and from which the waterproofing-liquid is dipped up and poured over its upper surface, running back into the tank over the edges $d\,d$ of the cloth. The cloth, after receiving the waterproofing-liquid, passes over and under or in contact with the sharp square edges of a series of stationary scraping-blades, $e\,f\,g\,h\,i$, preferably composed of steel, which extend transversely across the machine, and are secured to suitable bars or supports, 15. The blades $e\,f$ are arranged flatwise, the edge of the blade $f$ being placed a little above and slightly overlapping the edge of the blade $e$, so as to leave a narrow throat or passage for the cloth, which thus bears firmly on the edges of both of these blades. The blades $g\,h\,i$ are set up edgewise, or with their sides in vertical planes, the blade $h$ being arranged between the blades $g\,i$, as seen in Fig. 2, so that the cloth will pass over the edge of $g$, under the

edge of $h$, and over the edge of $i$, the blade $h$ being made adjustable vertically by means of the screws $k$, in order that it may be raised or lowered to vary the tension upon the cloth and the consequent degree of force with which it is drawn over the scraping-edges. These scraping-blades serve to uniformly remove the surplus oil or waterproofing compound from the surface of the cloth, as it is tightly drawn over or in contact therewith, in such manner as to leave all of its pores filled with the oil, and at the same time impart a smooth and superior finish to its surface, the variation of the tension by means of the adjustable blade $h$ causing the fabric to be scraped with more or less force, as may be required, to render the surface more or less smooth. We do not, however, limit ourselves to the precise number or arrangement of the scraping-blades shown in Figs. 1 and 2, as any suitable number may be employed, so placed as to admit of the cloth being drawn over or in contact with their edges, without departing from the spirit of our invention. For instance, they may all be placed edgewise in two series, one above the other, as seen in Fig. 3. The upper series, each one of which extends down between two contiguous blades of the lower series, being made adjustable vertically in the same manner as the blade $h$, Fig. 2, to vary the tension on the cloth, and thus cause more or less oil to be removed from the surface thereof. Care must, however, be taken in adjusting the blades to prevent the cloth from being drawn over them so tightly as to cause it to be cut or injured thereby. After leaving the scraping-blades, the cloth passes beneath a dressing-cylinder, E, which is provided with a series of radial sharp square-edged blades, $l$, and revolves rapidly in a direction contrary to that in which the cloth is moving. This cylinder is preferably made to rotate at a speed of about three hundred revolutions a minute, its blades $l$ bearing lightly on the cloth, and serving to remove any dirt or impurities or surplus oil from its surface which the scraping-edges may have failed to take off, and also by their shearing action smoothly and beautifully finishing the surface of the goods, as desired. Instead of a single dressing-cylinder E, two or more may be employed, if found desirable. The cloth, after having been acted upon by the dressing cylinder or cylinders, passes under a roll, G, covered with cloth or felt, which gives a final finish to the fabric; but this roll may be dispensed with, if desired. The cloth then passes over a guide-roll, $m$, to the take-up roll H, upon which it is wound, and by means of which it is drawn through the machine, the shaft of this roll being provided with a pulley, $n$, over which passes a belt, $p$, whereby the roll is rotated slowly, as is necessary to prevent an excessive strain being put upon the cloth while passing in contact with the scraping-blades. The cloth is then unwound from the take-up roll H and hung up and dried, after which it is again passed through the machine, with the opposite surface uppermost, which is thus coated with the waterproofing substance, and acted upon by the scraping-blades, dressing-cylinder, and finishing-roll in the same manner as described for the first surface. If the surface of the fabric last coated and treated, as described, is not found to be sufficiently smooth, the fabric is again passed through the machine, with this last-coated side uppermost, without applying thereto at this operation any more of the waterproofing substance, and the fabric may be passed through the machine in this manner any desired number of times until both surfaces have been given the desired smooth finish. The fabric is then again hung up and dried, after which as many additional coats of the waterproofing substance may be applied to the fabric as may be found necessary to render it perfectly impervious to water, by passing it repeatedly through the machine, as described in the first place, each coat being finished by the subsequent action of the scraping-blades and dressing cylinder or cylinders, the fabric being allowed to dry properly after each application of the waterproofing substance before it is again coated therewith.

Where very heavy fabrics are being treated, instead of applying the waterproofing substance by dipping it up from the tank B and pouring it over the upper surface of the fabric, as previously described, we prefer to pass the fabric through the tank under a guide-roller $q$, which insures its entire immersion in the waterproofing-liquid, which is thus applied to both surfaces at once, and the complete saturation of the fabric thus effected.

It is evident that our invention may be employed for waterproofing paper as well as cloth, if desired.

The above-described process enables us to entirely dispense with the coat or coats of oil or oil compound heretofore applied to the surface of the fabric by means of a brush, which gave it a rough and unsightly appearance, and consequently a much smoother and better finished fabric is produced, which is thoroughly and uniformly permeated with the oil or oil-compound, and is thereby rendered more effective as a water-repellent, and also stronger, tougher, and more durable; and as no pressure-rolls are employed, the oil is not expressed from the central or inner portion of the fabric, but is allowed to remain therein and thoroughly fill the pores, as required, the scraping-blades merely removing the surplus oil from the surface of the fabric, and giving the latter a smooth finish.

Oiled cloth, made in accordance with our invention, is intended principally for water-proof clothing; but it may be used to advantage for horse-covers, hats, and a variety of other articles, and may be made of any degree of fineness or thickness, and of any desired color.

We are aware that waxing paper by transferring the wax to the paper, heating the same to cause its incorporation therewith, and subsequently removing the surplus wax by scrapers, and also machines for automatically spreading and covering fabrics with enameling or other substance or compound, are old, and such we do not wish to be understood as claiming broadly as our invention.

What we claim as our invention, and desire to secure by Letters Patent, is—

1. In a machine for treating fabrics to render them water-proof, the combination, with a tank or receptacle, B, for containing the waterproofing substance, and means for drawing the fabric through the machine, of a series of sharp-edged scraping-blades, so arranged that the fabric will be drawn thereover or in contact therewith in its passage through the machine, for the purpose of removing the surplus oil or waterproofing substance from its surface and imparting a smooth finish thereto, substantially as set forth.

2. In a machine for treating fabrics to render them water-proof, the combination, with a tank or receptacle, B, for containing the waterproofing substance, and means for drawing the fabric through the machine, of a series of sharp-edged scraping-blades, one or more of which are made adjustable in order to vary the tension upon the fabric as it is drawn under and over or in contact with the scraping-edges, substantially as described.

3. In a machine for treating fabrics to render them water-proof, the combination, with a tank or receptacle, B, for containing the waterproofing substance, means for drawing the fabric through the machine, and a series of scraping-blades, as described, of one or more rotating dressing-cylinders, E, provided with a series of blades, $l$, adapted to remove all dirt, impurities, or surplus oil from the surface of the fabric not previously removed by the scraping-edges, and impart a smooth, even finish thereto, substantially as set forth.

4. The herein-described machine for treating fabrics to render them water-proof, consisting essentially of the roll C, tank B for containing the waterproofing substance, a series of scraping-blades for removing the surplus oil from the surface of the fabric, one or more rotating dressing-cylinders, E, provided with blades $l$, and the take-up draft-roll H, with or without the finishing-roll G, the whole combined and adapted to operate substantially as described.

5. The process of treating fabrics to render them waterproof, the same consisting in drawing the fabric, after the application thereto of the waterproofing substance, over or in contact with a series of sharp-edged scraping-blades for the purpose of removing the surplus oil from its surface, and then subjecting it to the action of one or more rapidly-revolving dressing-cylinders provided with sharp-edged blades adapted to remove all remaining dirt or impurities from its surface, and impart a fine, smooth finish thereto, substantially as set forth.

Witness our hands this 5th day of January, A. D. 1882.

NATHANIEL S. YORK.
ALBERT W. LANE.

In presence of—
JOSEPH D. DRIVER,
D. CHESTER TARR.